Paul Bauer
INVENTOR.

BY Edward Dugas
AGENT

June 17, 1969 P. BAUER 3,450,196

GAS PRESSURE CONTROL FOR VARYING THERMAL CONDUCTIVITY

Filed Aug. 30, 1967 Sheet 2 of 2

Paul Bauer
INVENTOR

BY Edward Dugas
AGENT

United States Patent Office 3,450,196
Patented June 17, 1969

3,450,196
GAS PRESSURE CONTROL FOR VARYING THERMAL CONDUCTIVITY

Paul Bauer, Reseda, Calif., assignor to TRW Inc., Redondo Beach., Calif., a corporation of Ohio Filed Aug. 30, 1967, Ser. No. 664,393
Int. Cl. G05d *23/27*, F28f *13/02*
U.S. Cl. 165—32 5 Claims

ABSTRACT OF THE DISCLOSURE

Apparatus varying the rate of heat loss or absorption from a spacecraft component such as a battery. The component is surrounded with multiple layers of thermal insulation having a finite displacement therebetween. The outer layer of thermal insulation forms a pressurizable container about the component. A gas or fluid is passed between the layers of thermal insulation. The pressure of the gas or fluid is varied in a controlled manner which in turn varies the thermal conductivity of the gas or fluid, thereby regulating the heat loss or absorption of the component.

*Background of the invention*

This invention pertains to the field of temperature controlling devices and, more particularly, the invention is concerned with maintaining the temperature of a component such as a battery to within predetermined levels. Various types of heat transfer devices exist in the prior art for dissipating heat from electronic equipment and the like and for maintaining the temperature of the equipment within a predetermined range of values. One such device is disclosed in U.S. patent application Ser. No. 642,098, entitled "Active Heat Transfer Device," by Hampden O. Banks, et al., filed on May 29, 1967, and assigned to TRW, Inc., the assignee of the present invention. In that application, a continuous heat source such as an isotope heat source is contained in a base plate onto which components such as batteries are mounted. The base plate is provided with heat activated bi-metallic switches which provide a variable heat path to a heat sink in a controlled manner. Heat is then dissipated or drawn off from the continuous heat source when the temperature of the component rises above a predetermined level.

Another prior art device is disclosed in U.S. patent application Ser. No. 344,327, entitled "Thermoelectric Temperature Controller," by Hampden O. Banks, et al., filed on June 7, 1967, and assigned to TRW, Inc. In that application, the temperature of a battery is to be maintained within a predetermined range of temperature values. A thermoelectric semiconductor is connected electrically to the battery through a switch. The battery and a continuous heat source are encapsulated in a thermal insulating material. The entire assembly is then mounted on a heat sink with the thermoelectric semiconductor passing through the insulating material and making thermal contact with the heat sink and the heat source. The thermoelectric semiconductor is connected to the battery through a temperature-sensitive switch which, when activated, applies a potential to the thermoelectric semiconductor in a correct polarity such that the thermoelectric device either generates a cold point or a hot point at the heat sink. The thermoelectric semiconductor then determines and controls the amount of heat which is drawn from or transferred to the battery. The last-mentioned device requires that a fair amount of power be either drawn from the battery source or be obtained from some other external source in order to maintain the required temperature range. In various spacecraft operations, power requirements are at a premium, making it highly desirable to utilize a device which achieves the same or better temperature control while utilizing less power. The method and apparatus of this invention achieves this end.

*Summary of the invention*

In a preferred embodiment of this invention, a component which is to have its environment thermally controlled is encased with multiple layers of thermal insulating material, the outer layer of which forms a pressurized container. A gas under controllable pressure is admitted between the layers of thermal insulation. An exhaust port is attached to and passes through the outer thermal layer, the opening of the exhaust port is controlled so as to vary the pressure between the insulation layers which in turn varies the thermal conductivity between the layers. The entire apparatus is designed specifically for use in space where the vacuum of space will diffuse the gas as soon as the exhaust port is opened; otherwise, heavy vacuum-pumping equipment would be needed. If a gas is used, it can be supplied from the spacecraft propellant or fuel battery tanks (in the case of hydrogen and except for extremely long missions, would require very small amounts of gas).

The thermal conductivity of a gas is independent of pressure until the mean free path of the molecule has been increased (by reducing pressure) to the point at which it is equal in magnitude to the space between the surfaces across which heat is being transferred. Thus, if the mean free path is 1/10 the spacing between surfaces, the thermal conductivity is the same as that at higher pressures. The mean free path varies inversely and linearly with pressure.

High pressure need not be used since it is only necessary to increase the pressure of the gas high enough to make the mean free path of a gas molecule small in comparison with the spacing between insulation layers in order to achieve full conductivity. This variable conductivity method can be used to control the rate of heat out of, or into, the component. The variation in gas pressure between the thermal insulation layers therefore directly varies the rate of heat leak through the insulation.

Accordingly, it is an object of the present invention to provide a novel method and apparatus for thermally controlling the thermal environment of a component.

It is a further object of the present invention to provide a method and apparatus utilizing a variable pressure on molecules to vary the conductivity through a thermal path which includes the molecules.

It is a further object of the present invention to provide a method and apparatus for maintaining a thermal climate for a component which has specific application to space missions.

The aforementioned and other objects of the present invention will become more apparent when taken in conjunction with the following description and drawings, throughout which like characters indicate like parts, and which drawings form a part of this application.

*Description of the preferred embodiment*

Figure 1:
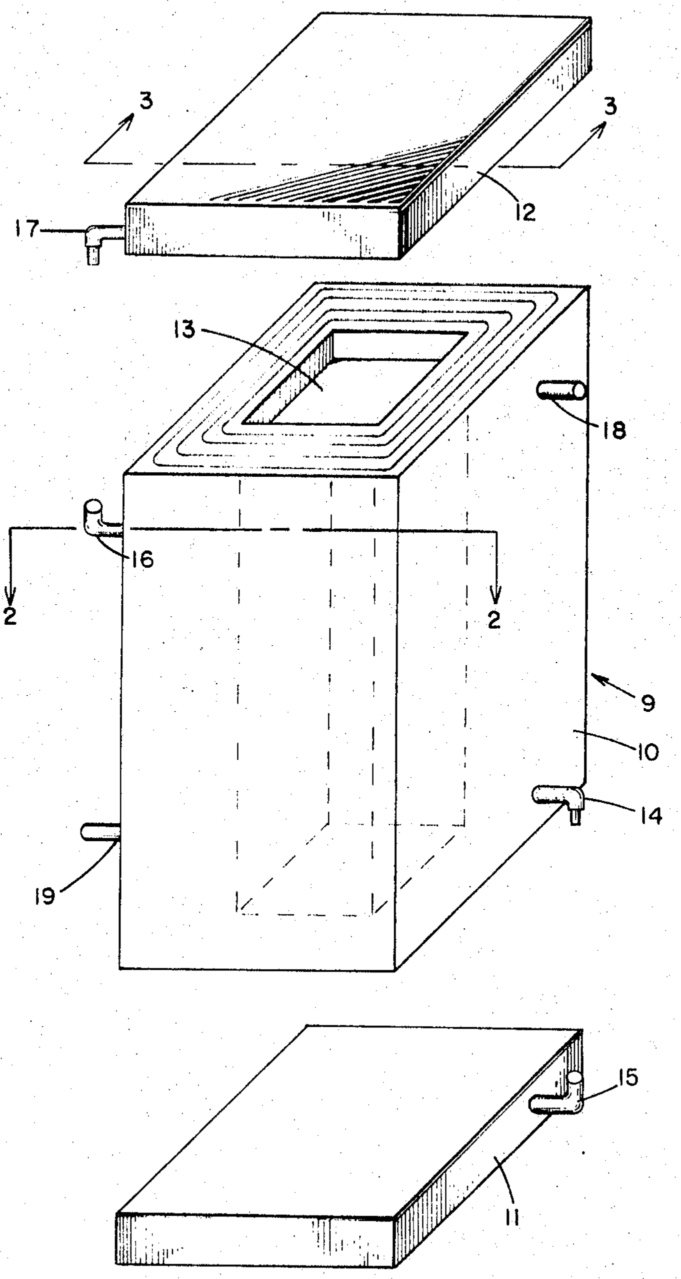
FIGURE 1 illustrates in an exploded projection view a preferred embodiment of the invention.

Referring to FIGURE 1, the component 13 is shown encased around its length in layers of thermally insulating material 20 to form a housing 10. The housing 10 is open at both ends. End members 11 and 12 are placed on opposite ends of the housing, closing off the ends so as to form the pressure-tight container 9. The thermal insulating material 20 may be a Mylar-type material having a reflective metallic coating 20*a* on one surface thereof. In the embodiment described in this application, the reflective surface for all layers is toward the component. Depending on the results desired or the mission involved, the reflecting coating may be facing away (outward) from the component to reflect heat away from the component. Various combinations of reflective surfaces may also be used to achieve desired results. The various combinations will be obvious to those persons skilled in the art from the disclosure of this invention.

Pipes 15 and 17 are inserted into the end members 11 and 12, respectively, and provide an exit and entrance path for a fluid. Pipes 14 and 16 enter the outer layer (wall) of housing 10 and in the assembled condition are connected in a pressurized fit to pipes 15 and 17, respectively, thereby providing a path for the fluid through end members 11 and 12 and the housing 10. An inlet pipe 18 and outlet pipe 19 are inserted through the outer layer of housing 10 at opposite ends of the housing 10.

Figure 2:
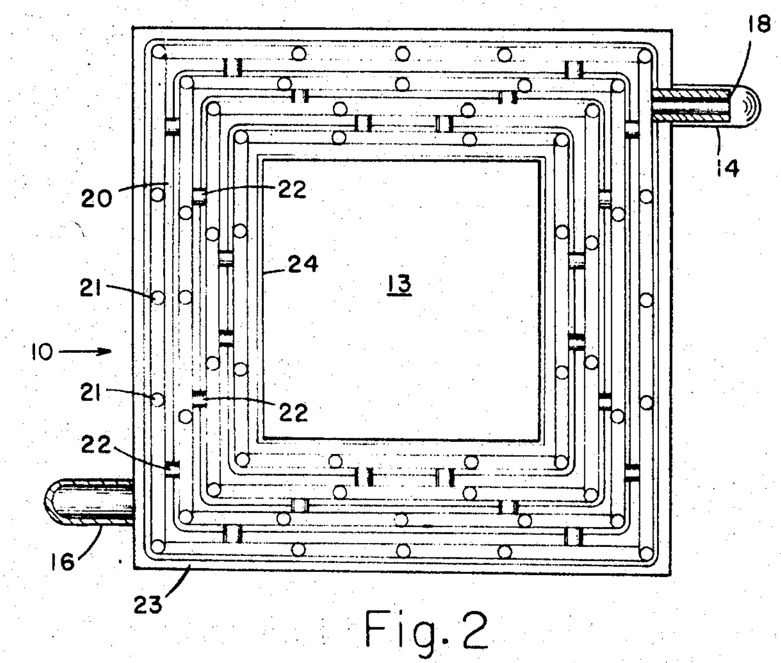
FIGURE 2 illustrates a sectioned view of the embodiment of FIGURE 1 taken along the sectioning line 2—2.

Referring to FIGURE 2, the thermal insulating material 20 is wrapped around the component 13, forming a plurality of discrete layers. A continuous strip of insulating material may also be wound around the component a plurality of times so as to form multiple layers which are not discrete. Standoffs 21 are positioned periodically around the component between each layer of insulating material so as to maintain a gas or vacuum space between successive layers. The standoff insulators 21 are preferably made in the shape of long rods from a thermally non-conducting material such as Teflon. The outermost and innermost layers of thermal insulating material 23 and 24, respectively, form an airtight pressurizable seal about the component 13 when the end members 11 and 12 are attached to the ends of housing 10. Openings 22 are randomly spaced through the layers of thermal material 20. These openings allow the fluid to diffuse equally through the layers 20 between layers 23 and 24. An inlet pipe 18 passes through the outer thermal wall 23 and provides an entry path for the insertion of a fluid into the spaces between layers 23 and 24. The exit pipe 19 (shown in FIGURE 1) also projects through the outer wall 23, preferably from a position that is the farthest distance from the inlet pipe 18. An inlet and exit pipe 16 and 14 also project through the outer wall portion 23 and, as shown in FIGURE 1, connect to the end members 11 and 12 through pipes 15 and 17, respectively.

It may thus be seen that because the intra layer space does not contain any thermally significantly conductive materials the overall control range is greatly increased since the thermal conductivity is decreased when the space is evacuated. In addition because of the large, open, and non-gas adsorbing nature of the intra layer space, the control gas may be very rapidly withdrawn or inserted resulting in very best control response times.

Figure 3:
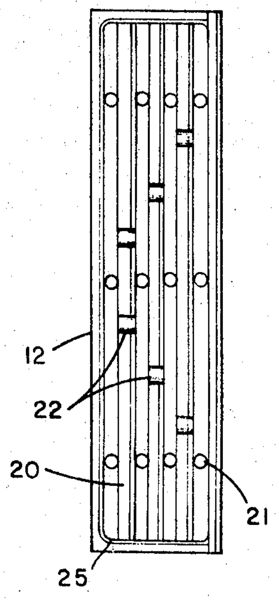
FIGURE 3 illustrates a sectioned view of the embodiment of FIGURE 1 taken along the sectioning lines 3—3.

Referring now to FIGURE 3, which is a cross-section of the end members 12, a plurality of thermal insulating layers 20, corresponding in numbers to the layers used to wrap the component 13 in FIGURE 2, are utilized in the end members 11 and 12. Each of the thermal layers 20 has a plurality of randomly spaced openings 22 to allow the gas molecules to diffuse equally between the various layers. The thermal insulating standoff members 21 maintain the air spacing between the various layers. The outermost thermal layer 25 encases the inner layers 20 to form a pressurizable end member. The end member 11 is identical in construction to end member 12 and therefore a discussion of its construction will not be entered into. An inlet and exit pipe 15 (shown in FIGURE 1) extends through the outer thermal layer 25 to provide an inlet and outlet path for the gas molecules.

Figure 4:
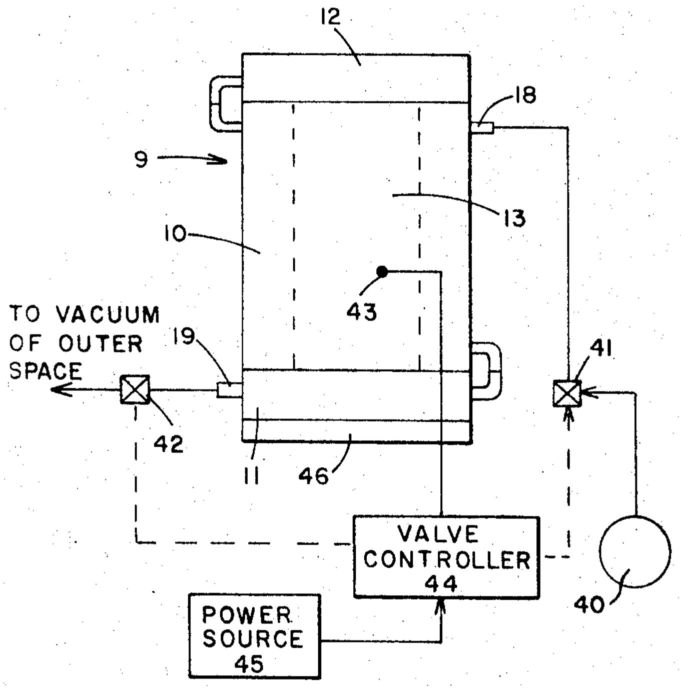
FIGURE 4 illustrates in block schematic form the operating embodiment of FIGURE 1.

Referring now to the block diagram of FIGURE 4, the component 13 is shown encapsulated within the housing 10 with the two end members 11 and 12 sealed to the housing 10, forming a pressurizable container 9 about the component 13. Mounted in close proximity to component 13 is a thermal sensor 43 which provides an output signal indicative of the temperature of the component. A fluid (gas) supply 40 is connected to the inlet pipe 18 through a gas inlet valve 41. The outlet pipe 19 is connected to a gas exhaust valve 42 which opens to the vacuum of outer space. A valve controller 44 is connected to inlet valve 41 and exhaust valve 42 so as to actuate these valves in a predetermined manner under command of the output signal from the thermal sensor 43. A power source 45 is connected to the control box to supply the necessary power for actuating the valves, the valve controller and the thermal sensor. A heat source 46, which may be an isotope heating source, is placed in thermal contact with the end member 11 so as to provide a continuous source of heat to the component 13 when the temperature of the component is to be maintained above a predetermined minimum value and when the component itself is incapable of generating the required amount of heat. The heat source 46 may be removed when the component itself is a heat generator and in its place a heat sink may be attached in thermal contact with the end member 11, or in thermal contact with any exterior portion of the housing member 10 so as to provide a cold point to which heat may be conducted. The heat source 46 may also be placed in direct physical contact with the component 13 within the housing member 10.

By varying the partial pressure of the fluid which is trapped between the layers of the reflective insulation, it is possible to vary the conductivity of the pressurized chamber portion of the insulation from the conductivity achievable with an evacuated insulation to a value approaching that of the conductivity of the pure fluid (gas) or liquid. If hydrogen is used for the gas, a conductivity of approximately 1.2 B.t.u./inch/ft.$^2$/° F. is possible. The pressure required in the gas supply 40 need not be high enough to make the mean free path of the gas molecules small in comparison with the spacing between insulation layers in order to achieve full conductivity. The rate of heat leak out of the component is controlled by the gas pressure within the chamber and, in a similar manner, the entry of heat into the component area is also controlled by the conductivity and pressure of the gas.

In operation, the temperature of the component 13 is sensed by the thermal sensor 43; if the temperature is above a predetermined maximum, the control box 44 actuates the gas exhaust valve 42, allowing the gas to diffuse to the vacuum of outer space. This decreases the thermal conductivity between the heat source 46 and the component 13. If the temperature of the component 13 is below a predetermined minimum value, the exhaust valve 42 is closed and the inlet valve 41 opened, allowing the gas from the supply 40 to enter into the pressurized chamber, increasing the pressure and number of molecules between the layers of thermal insulation, which in turn increases the thermal conductivity between the heat source 46 and the component 13. The increased conductivity between the constant heat source and the component 11 will raise the temperature of the component 13 toward that of the heat source.

The method of this invention is then directed to the maintenance of the temperature of a component to within predetermined levels by varying the thermal conductivity path between the component and a heat source or in the case of cooling a heat sink. A fluid is placed in a thermal path between the heat source and the component and the pressure applied to the fluid molecules is varied so as to vary the thermal conductivity of the path.

What is claimed is:

1. Thermal apparatus for controlling the temperature of a body by control of the flow of thermal energy across a gaseous state gap between the body and an extrinsic heat reference, the apparatus comprising:

at least one inner layer of thermally insulating material disposed between said body and said heat reference;

an outer layer of thermally insulating material disposed about said at least one inner layer and forming a gas pressurizable container structure thereabout;

means for maintaining a finite spacing between said layers, such means being of non gas adsorbing and non thermally conductive character; and gaseous control means for controlling the gas pressure in said container structure over a range from a near vacuum state wherein the gas molecules collision mean free path is at least of the order of the magnitude of said spacing between layers to pressures significantly higher thereby providing a gaseous thermal conductivity range corresponding to said gas pressure range.

2. The invention, according to claim 1, wherein one surface of said layers of thermally insulating material is reflective.

3. The invention, according to claim 1, and further comprising a heat source in thermal contact with said outer layer of thermally insulating material.

4. The invention, according to claim 1, and further comprising a heat sink in thermal contact with said outer layer of thermally insulating material.

5. The invention, according to claim 1, which further includes:

a pressurized source of gas;

inlet valve means pressurizably connecting said source of gas to said pressurizable container;

outlet valve means connected to said pressurizable container for releasing said gas from said pressurizable container; and control means for activating said inlet valve and said outlet valve so as to control the pressure of said gas in said pressurizable container.

References Cited

UNITED STATES PATENTS

| | | | |
|---|---|---|---|
| 3,137,159 | 1/1965 | Bovenkerk. | |
| 3,244,224 | 4/1966 | Hnilicka | 165—32 |
| 3,270,802 | 9/1966 | Lindberg | 165—96 XR |
| 3,302,703 | 2/1967 | Kelly | 165—32 XR |

FRED C. MATTERN, Jr., *Primary Examiner.*

MANUEL ANTONAKAS, *Assistant Examiner.*

U.S. Cl. X.R.

165—135